United States Patent [19]

Tokue

[11] Patent Number: 4,474,414
[45] Date of Patent: Oct. 2, 1984

[54] TRACK BELT FOR SNOWMOBILES AND METHOD OF PRODUCING THE SAME

[75] Inventor: Minoru Tokue, Isehara, Japan

[73] Assignee: The Yokohama Rubber Co., Ltd., Tokyo, Japan

[21] Appl. No.: 277,973

[22] Filed: Jun. 26, 1981

[30] Foreign Application Priority Data

Jun. 30, 1980 [JP] Japan .............................. 55-91799[U]

[51] Int. Cl.³ ............................................. B62D 55/08
[52] U.S. Cl. ................................. 305/35 EB; 305/38; 305/56
[58] Field of Search .................. 305/35 R, 35 EB, 37, 305/38, 24, 56, 29

[56] References Cited

U.S. PATENT DOCUMENTS

| | | | |
|---|---|---|---|
| 2,330,794 | 9/1943 | Schonitzer et al. | 305/56 X |
| 3,120,409 | 2/1964 | Beall | 305/38 |
| 3,582,154 | 6/1971 | Russ | 305/35 EB |
| 4,023,865 | 5/1977 | Morissette | 305/56 X |
| 4,217,006 | 8/1980 | Dehnert | 305/35 EB |

Primary Examiner—Charles A. Marmor
Assistant Examiner—Michael S. Huppert
Attorney, Agent, or Firm—Armstrong, Nikaido, Marmelstein & Kubovcik

[57] ABSTRACT

A track belt for snowmobiles having a plurality of guide clips attached to such portions of the inner peripheral surface of the track belt which face suspension rails of the snowmobile, at predetermined intervals in the circumferential direction of the track belt. Each guide clip has a fastening portion formed at each side of a sliding portion and a guide portion integrally extending from one end of the sliding portion, and ribs are formed at the sides of the guide portion and connected to both fastening portions. Also disclosed is a method of producing the track belt.

2 Claims, 15 Drawing Figures

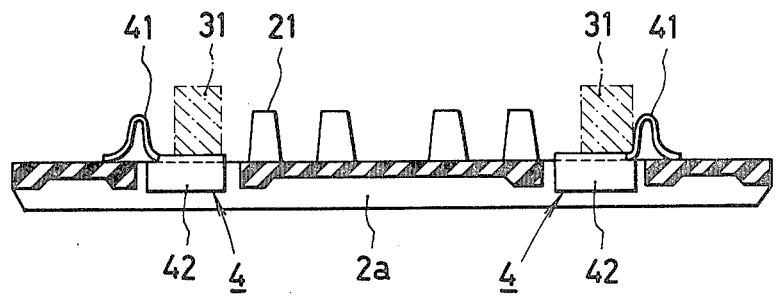
FIG.1 PRIOR ART
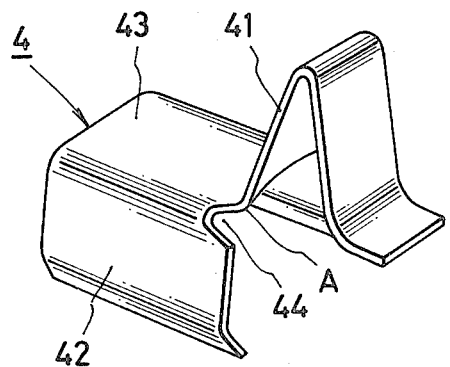
FIG.2 (A) PRIOR ART
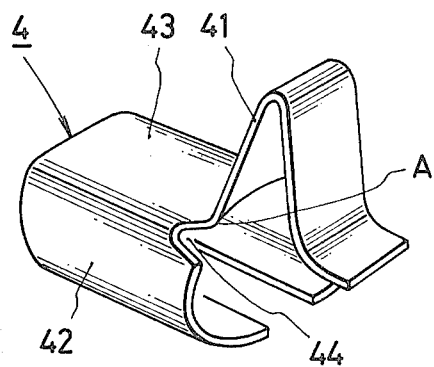
FIG.2 (B) PRIOR ART
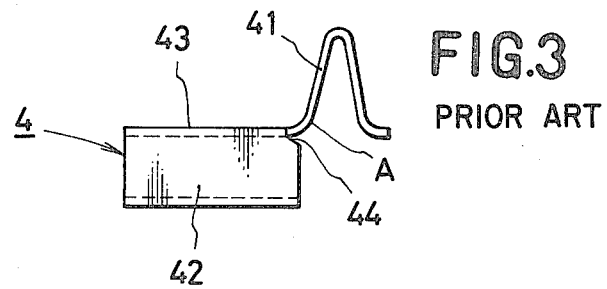
FIG.3 PRIOR ART

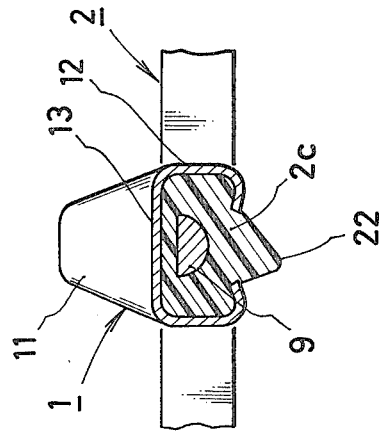
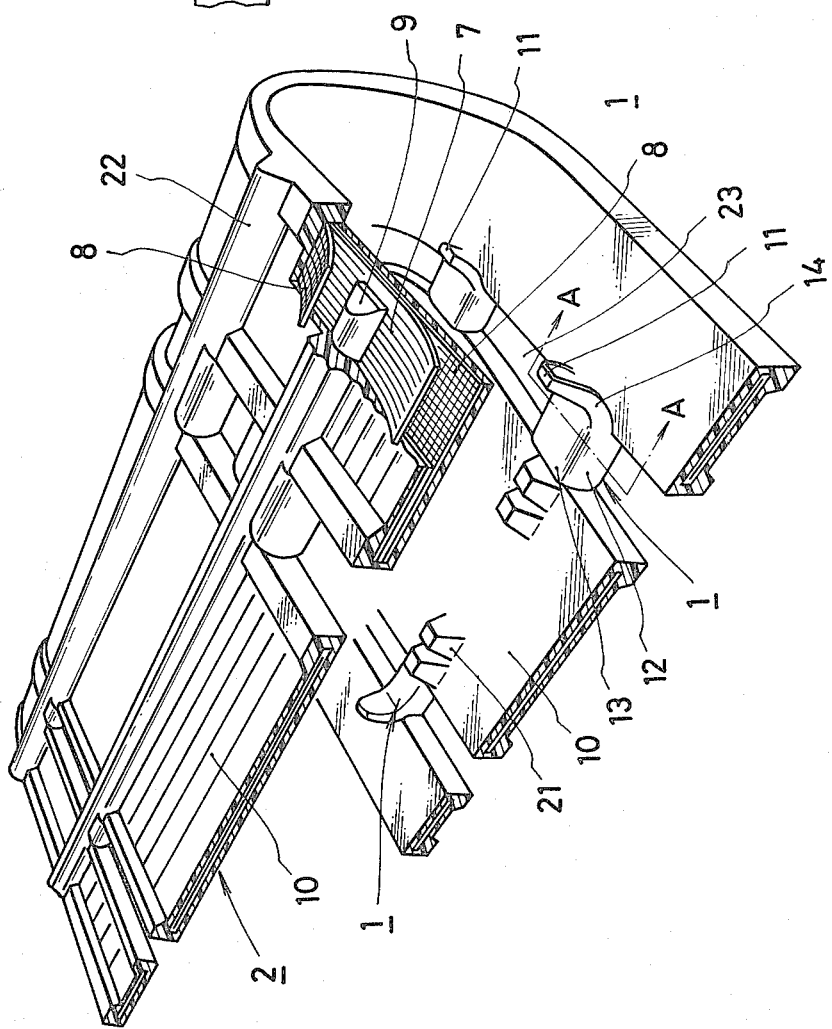
FIG. 9 (A)  FIG. 9 (B)

TRACK BELT FOR SNOWMOBILES AND METHOD OF PRODUCING THE SAME

BACKGROUND OF THE INVENTION

1. Field of the Invention

The present invention relates to a track belt for snowmobiles and, more particularly, to a track belt for snowmobiles improved in the construction of guide clips for guiding suspension rails which in turn support the chassis of the snowmobile, as well as to the method of producing the same.

2. Description of the Prior Art

In conventional track belts for snowmobiles, guide clips are disposed at certain intervals in the endless direction of the track belt, and it is structured such that the suspension rails for supporting the chassis of the snowmobile are prevented by or at the guide portion or face of guide clips from being disengaged from the track belt.

With a snowmobile having the above structure, however, it occurs during its turning or running on a slope that the suspension rail is repeatedly pressed against the guide face of guide clips in an impacting manner to result in a breakage of the guide face of guide clips. To overcome this problem, it has been made in the prior art to form guide clips with use of a steel plate having a high rigidity and a long durability and then subject the formed guide clips to a heat treatment, whereby the production cost has necessarily to be unduly high.

SUMMARY OF THE INVENTION

Accordingly, an object of the present invention is to provide a track belt for snowmobiles having an improved guide clip having a high mechanical strength.

Another object of the invention is to provide a track belt having a high durability as well as a high stability.

To attain these and other objects which will become more apparent as the description proceeds, there is provided a track belt for snowmobiles which has a plurality of guide clips disposed at such side portions on the inner peripheral surface of the track belt which correspond to the location of suspension rails and at constant intervals in the circumferential direction of the track belt, wherein each guide clip has a sliding portion, a fastening portion formed at each side of the sliding portion and a guide portion or face integrally protruding from one end of the sliding portion and having a rib formed at each side thereof, the ribs being integrally extending from the guide portion and also the fastening portion. According to this structuring of the invention, the guide clip can exhibit a remarkably improved mechanical strength to enhance the durability and safety of a snowmobile track belt incorporating the guide clips, and it is made feasible to make use of easily processable materials such as a soft iron which could never be made use of as the material for guide clips, whereby the production of the guide clips can be greatly facilitated and the production cost is considerably curtailed.

BRIEF DESCRIPTION OF THE DRAWINGS

FIG. 1 is a breadthwise sectional view of a track belt for snowmobiles incorporating conventional guide clips;

FIG. 2 (A) is a perspective view of a conventional guide clip in a state yet to be fastened or caulked;

FIG. 2 (B) similarly is a perspective view of the conventional guide clip of FIG. 2 (A), now in a state of being caulked or fastened;

FIG. 3 is a side elevational view of the prior art guide clip of FIG. 1 in the fastened state;

FIG. 5 (B) is a perspective view of the guide clip of FIG. 5 (A) now in a fastened or caulked state;

FIG. 9 (A) is a perspective partial view of a snowmobile track belt incorporating guide clips according to the invention;

FIG. 9 (B) is a sectional view taken along the line A—A of FIG. 9 (A);

DESCRIPTION OF THE PREFERRED EMBODIMENTS

Figure 4:
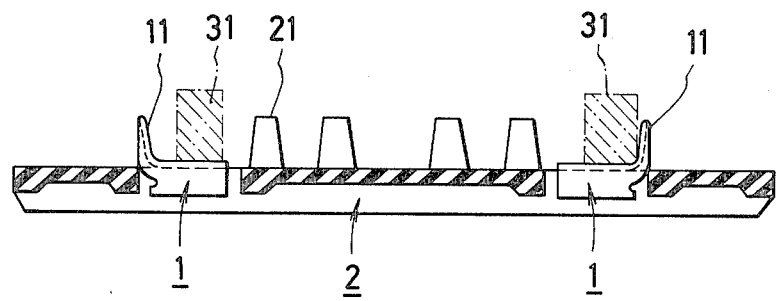
FIG. 4 is a breadthwise sectional view similar to FIG. 1, but showing a snowmobile track belt incorporating guide clips according to the present invention.

Before entering a detailed description on the preferred embodiments of the present invention, which will soon follow, it is herein proposed to first briefly review the structure of presently snowmobiles in conjunction with an example thereof illustrated in FIGS. 1 through 3 of the accompanying drawings.

As shown in FIG. 1 initially, the conventional snowmobile track belt indicated at 2a has guide clips 4 disposed in a left and a right side portions of the inner surface thereof. In the endless or circumferential direction of the track belt 2a, a plurality of the guide clips 4 are mounted at constant intervals, and by means of a guide portion or face 41 which the guide clips 4 individually have, a pair of suspension rails 31 for thereon supporting the chassis of the snowmobile are prevented from being disengaged from the track belt 2a. Then, as shown in FIGS. 2 (A), 2 (B) and 3, at a base portion of the guide portion 41, the guide clip 4 has a notch 44 provided at each side so as to avoid distortion produced to the clip 4 during molding thereof, and it is secured to the track belt 2a by its fastening or caulking portions 42 integrally formed at the sides of its sliding portion 42.

A difficulty indicated in connection with this conventional snowmobile consists in that the guide portion 41 of the guide clip 4 tends rather with ease to undergo breakage particularly at the bent portion indicated at A: This problem takes place when the snowmobile repeats tilting in the position and turning in the running direction or when it runs on a slope and the suspension rails 32 then repeats impinging contacts against the guide portion or face 41.

Thus, it is practised according to the today art to form the guide clip from a steel plate having a high rigidity and a high durability and, subsequent to the formation, carry out a heat treatment of the formed guide clip, whereby it disadvantageously is that the production cost has to be high.

Figure 5:
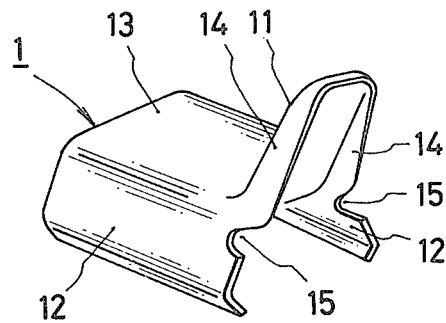
FIG. 5 (A) is a perspective view of a guide clip in accordance with the present invention in an unfastened state.
Figure 5:
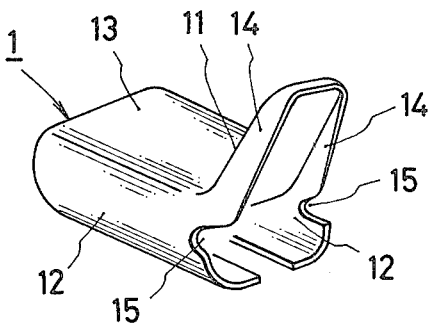

The present invention makes effectively utilizable such a steel plate as being easily processable, for example a soft iron plate, and provides guide clips which can exhibit a sufficient strength even without being subjected to a heat treatment. Improved guide clips according to the present invention are shown in FIGS. 4 through 6.

Thus, now entering a detailed description on the present invention with reference to FIGS. 4 through 6, as shown the track belt for snowmobiles includes guide clips 1 according to the present invention, each of which comprises a guide portion or guide face 11 formed erect toward up at one end of a sliding portion 13, a fastening or caulking portion 12 bent toward below at each side of the sliding portion 13 and a rib 14 formed at each side of the guide face 11, integrally extended from the fastening portion 12. Guide clips 1 may be easily formed from a sheet or plate of a material easy to process, such as a soft iron for example.

Figure 6:
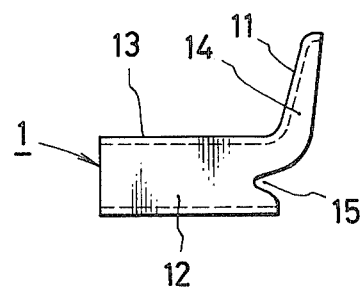
FIG. 6 is a side elevational view of the fastened guide clip of FIG. 5 (B)
Figure 7:
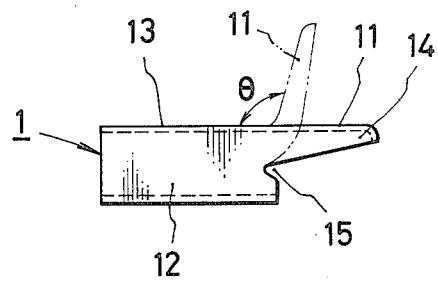
FIG. 7 is a side elevational view, taken for illustration of the production process for the guide clip in accordance with the invention.

That is to say, firstly the pair of fastening or caulking portion 12 continuously extended from the sides of the sliding portion 13, as well as the pair of ribs 14 continuous from the sides of the guide portion 11 extended from the sliding portion 13 and also continuous from an approximate midpoint of an edge portion of the fastening portion 12, as shown in FIG. 6, may be processed by bending toward below both side end portions of the sliding portion 13 and the guide portion 11, as shown by the solid lines in FIG. 7. Thereafter, the guide portion or face 11 may be bent upwardly by pressing as shown by phantom lines to finish production of the guide clip 1.

The reference numeral 15 denotes a notch formed at each side of the fastening or caulking portion 12 at a base part of the rib 14 to facilitate the bending of the guide portion 11 including the ribs 14 while avoiding generation of cracks. Since the notch 15 is spaced by the ribs 14 from the bent portion, an undesirable stress concentration to the notch 15, which may result in breakage, is avoided advantageously.

The angle of upward bending of the guide portion 11, $\theta$, should preferably fall between 90° and 105° to the upper surface of the sliding portion 13.

Figure 8:
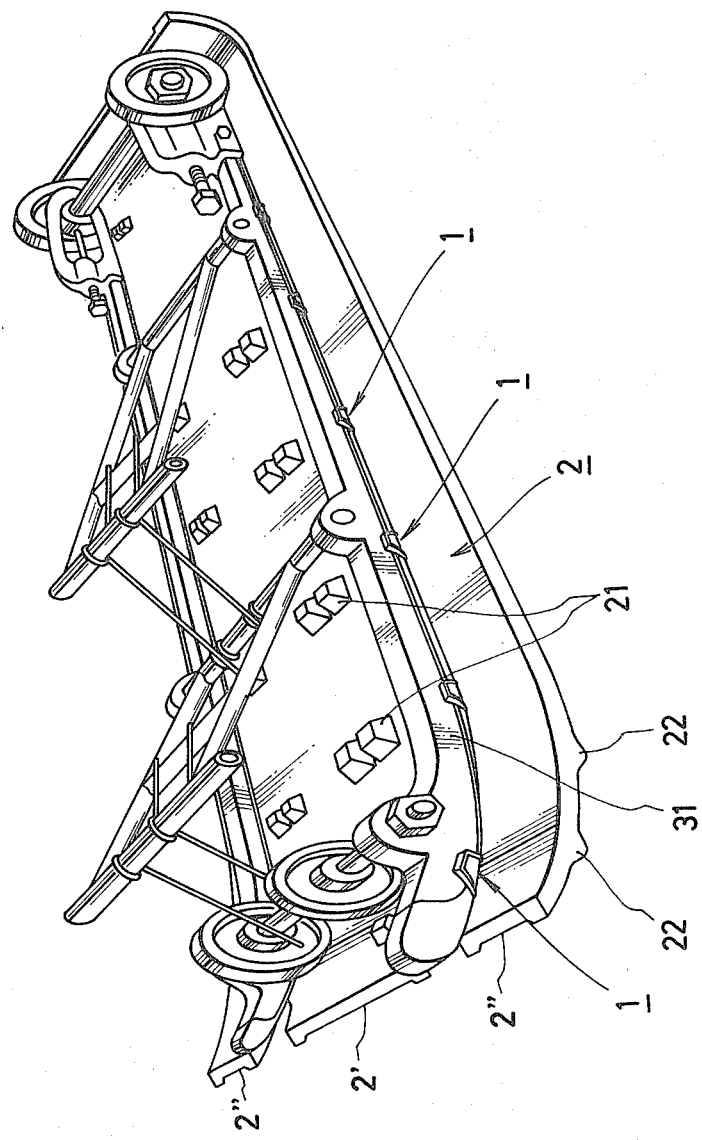
FIG. 8 is a perspective view, partly taken away, showing the arrangement of suspension rails and the track belt of a snowmobile incorporating guide clips according to the invention.

Now, with the reference transferred to FIGS. 8, 9 (A) and 9 (B), a description in greater detail will be entered in connection with a snowmobile track belt 2 incorporating guide clips 1 according to the present invention.

As best seen from FIG. 8, the track belt 2 comprises a central member 2' and side members 2", which altogether are connected by connecting portions 2c [FIG. 9 (B)], which are disposed at constant intervals in the endless direction of the track belt 2. Also, where connecting portions 2c are provided, the track belt 2 has a plurality of traction ribs 22 formed on its outer face, extending between the full width of the track belt. Further, adjacent the side ends of the central member 2' of the track belt 2, there are driving projections 21 provided on inner peripheral surface portions corresponding to the location of traction ribs 22. The arrangement is such that a driving power is transmitted from a driving wheel (not shown) through the driving projections 21 to the track belt 2 so that the latter is rotated to make the traction ribs 22 grip snow and thereby propel the snowmobile.

Guide clips 1 for guiding suspension rails 31 are attached to the above-mentioned connecting portions 2c, so that when the snowmobile makes a turn or runs on a slope, the suspension rails 31 can be prevented from becoming out of engagement with the sliding portion of the track belt 2.

The track belt 2 of the invention is constituted, as shown in FIG. 9 (A), by a tension member 7 made of a woven fabric or cord of synthetic fibers, metallic cord or the like material and a lateral stiffening member 9 made of a bar steel or FRP bar disposed in the width direction of the track belt 2, which members 7 and 9 are sandwiched between upper and lower protective sheets 8 of a woven fabric of synthetic fibers, which are further covered with a flexible member 10 of such as a rubber for example, to thereby provide an endless belt. The above-mentioned lateral stiffening members 9 are disposed at locations of the aforementioned connecting portions 2c. Spaces defined between the central portion 2' and side portions 2" of the track belt 2 and the connecting portion 2c comprise open spaces 23. The guide clip 1 is attached, as shown in FIG. 9 (B), at the connecting portion 2c, by fastening or caulking.

Figure 10:
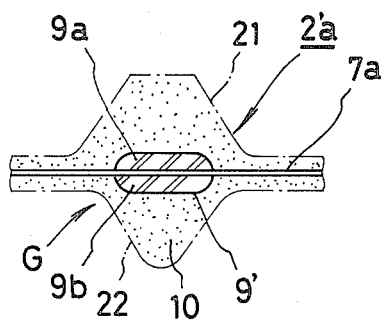
FIG. 10 is a longitudinal partial sectional view, showing a belt portion of a snowmobile track belt incorporating guide clips in accordance with a second embodiment of the present invention.
Figure 11:
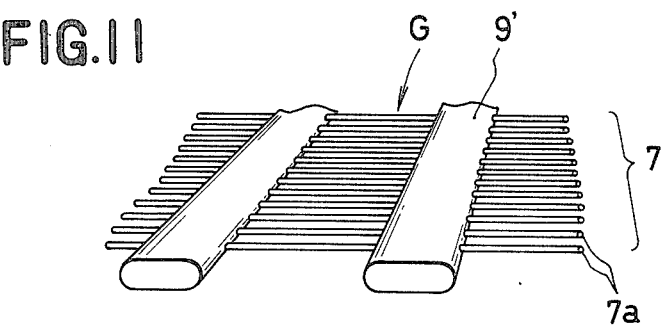
FIG. 11 is a perspective partial view of an endless framework embedded in the track belt shown in FIG. 10.

Referring to FIGS. 10 and 11 showing a track belt 2'a in accordance with a second embodiment of the invention, the track belt 2'a of this embodiment is constituted by an endless framework belt G embedded in a flexible member 10 such as of a rubber. The endless framework belt G is constituted, as shown in FIG. 11, by an endless tension member 7 having a plurality of reinforcement cords 7a arranged in a side-by-side relation and a plurality of lateral stiffening members 9' of a plastic arranged transversely of the reinforcement cords 7a at constant intervals in the longitudinal direction of the tension member 7 so as to interconnect the reinforcement cords 7a. The snowmobile track belt 2'a of the embodiment under consideration is produced in the following process: As a first step, a plurality of reinforcement cords 7a made of plastic fiber cords or metallic cords are substantially equally spaced in the breadthwise direction of the track belt 2'a to form the endless tension member 7. Then, a plurality of pairs of upper and lower members 9a and 9b made of an unhardened thermosetting resin are placed to traverse each reinforcement cord 7a at predetermined intervals in the circumferential direction of the tension member 7 in a manner such that the upper and lower members 9a and 9b in each pair sandwiches each reinforcement cord 7a therebetween. Then, the members 9a and 9b of thermosetting resin are heated and thermally set to form a plastic lateral stiffening member 9 integrated with the tension member 7, thereby to form the endless framework belt G.

This endless framework belt G is coated with a flexible member 10 such as unvulcanized rubber. The endless framework belt G wrapped by the material or member 10 is then placed in a mould (not shown) having a mould cavity provided with recesses for the traction ribs 22 and driving projections 21, and a vulcanization is effected in this mould to form the track belt 2'a of the desired shape.

According to the invention, therefore, it is possible to form a track belt 2'a having smaller width and weight as compared with conventional track belts, while remarkably reducing the rigidity against bending, thereby to drastically reduce the power required for the driving. In incorporating guide clips 1 to the track belt 2'a, they may be attached to such portions of the connecting portions 2c as having the plastic lateral stiffening member 9' embedded therein.

Figure 12:
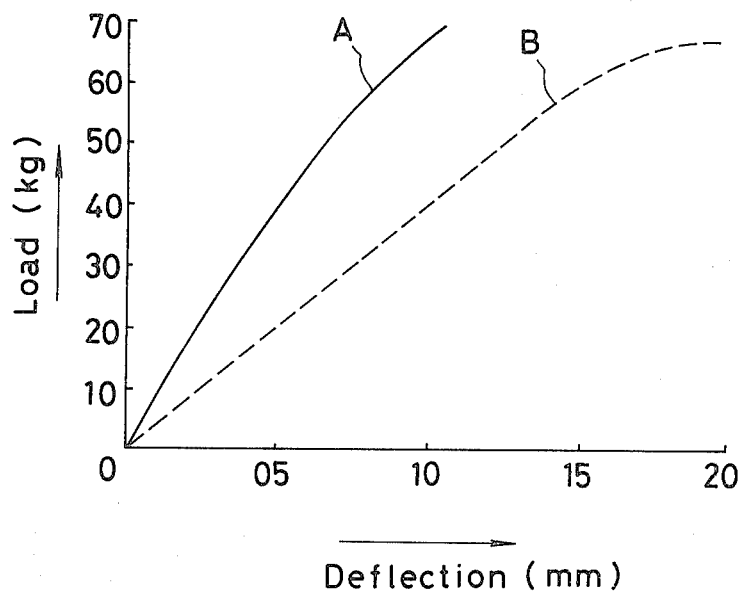
FIG. 12 is a graph showing the result of a load-deflection test conducted comparatively of the guide clip of the present invention and of a conventional guide clip.

Hereinafter, the difference in the durability between the guide clip 1 of the track belt of the present invention and the conventional track belt 4 will be explained with specific reference to FIG. 12 which shows the result of load-deflection tests conducted with the guide clip 1 [FIG. 5 (A)] of the invention and the guide clip 4 [FIG. 2 (A)] of the prior art. More specifically, the axis of ordinate in FIG. 12 represents the load, while the axis of abscissa representing the amount of deflection of the guide portion. The full-line curve A and the broken line curve B show, respectively, the characteristics of the guide clip 1 of the invention and the guide clip 4 of the prior art. The test was conducted by measuring the amount of deflection in relation to the load applied to the upper end of the guide portion 11 with the fastening portion 12 of the guide clip 1 fixed.

As will be seen from this FIG. 12, while the end of the guide portion 11 of the guide clip 1 of the track belt of the invention makes a small deflection of 0.25 mm in response to a load of 20 kg, the end of the guide portion 41 of the guide clip 4 incorporated in the conventional track belt exhibits a large deflection of 0.5 mm when the same load is applied. When the load is increased to 40 kg, the deflection at the end of the guide portion 11 of guide clip 1 incorporated in the track belt of the invention exhibited a deflection of 0.5 mm, while the corresponding portion of the prior art guide clip showed a deflection of 1.0 mm.

As has been described, the guide clip 1 used in the track belt of the invention exhibits a small deflection and, hence, superior stiffness, over the guide clip 4 of the conventional track belt.

A test was conducted to determine the durability of the guide clip 1 incorporated in the track belt of the invention in comparison with the guide clip 4 of the conventional track belt, the result of which is shown in Table 1 below.

The test was conducted by applying load (0 to 40 kg) repeatedly to the upper end of the guide portion until the guide portion is broken, while fixing the fastening portion of the guide clip in the same manner as in the load-deflection tests mentioned before.

TABLE 1

| | Guide clip of the Invention | Prior Art Guide Clip |
|---|---|---|
| 1. | 987,600 cycles | 124,300 cycles |
| 2. | 926,400 | 93,600 |
| 3. | 638,200 | 113,200 |
| 4. | 763,800 | 77,600 |
| 5. | 673,800 | 71,700 |

As will be understood from Table 1 above, the guide clip of the track belt in accordance with the invention exhibits, as a mean, a durability which is about 10 times as large as that of the guide clip in the conventional track belt. In a calculation in the experimental production, the production cost was reduced to about 77% of the production cost of the conventional guide clip.

Table 2 below shows the result of a test conducted to compare the durability of the guide clip 1 of the invention with that of the guide clip 4 of the prior art track belt.

This test was conducted by securing by caulking the guide clip 1 [FIG. 5 (A)] of the invention and guide clip 4 [FIG. 2 (A)] of the prior art to a track belt over a half circumference of the track belt, respectively, and subjecting the track belts to a test running. The testing conditions were as follows:

Speed: 100 km/h
Load: 120 kg
Running Distance: 8000 km

The number of remaining guide clips and rate of remaining guide clips in Table 2 below shows the number of guide clips observed to remain at the time of inspection after the bench durability test, and the rate of the number of remaining guide pieces to the total number of the guide pieces.

TABLE 2

| | Conventional Guide Clip | | | Guide Clip of Invention | | |
|---|---|---|---|---|---|---|
| Sample Nos. | total number | remaining clips | remaining rate | total number | remaining clips | remaining rate |
| 1. | 24 | 0 | 0% | 24 | 22 | 92% |
| 2. | 24 | 4 | 17 | 24 | 21 | 88 |
| 3. | 24 | 2 | 8 | 24 | 24 | 100 |

From Table 2 above, it will be seen that the remaining rate of the guide clip of the conventional track belt as a mean is as low as 8.33%, while the remaining rate of guide clips of the track belt of the invention is as a mean 93.33%. Thus, the guide clip of the track belt of the invention showed a durability which is more than 10 times as high as that of the guide clip of the conventional track belt.

As has been described, according to the invention, there is provided a track belt having a plurality of guide clips attached to the inner peripheral surface of the track belt so as to oppose to the suspension rails of both sides, each guide clip having fastening or caulking portion at each side of a sliding portion, a guiding portion integrally protruding from one end of the sliding portion, and ribs formed at both sides of the guiding portion and continuous from both sides of the fastening portion. On account of the provision of ribs as mentioned above, it is possible to remarkably improve the mechanical strength of the guide portion of the guide clip. This in turn permits the use of an inexpensive material having a high processability which has never been effectively utilized in the prior art due to insufficient mechanical strength. Thus, the invention greatly contributes to the reduction of the production cost and improved production efficiency.

In consequence, the present invention affords the production of guide clips having improved durability at a lower cost, and greatly improves the durability, safety and economy of the snowmobile track belt to which a number of guide clips are attached.

What is claimed is:

1. A track belt for snowmobiles having suspension rails guided by a plurality of guide clips secured at constant intervals to connecting portions connecting together a central member and side members of the track belt, each of said guide clips being an integrally formed clip comprising a sliding portion, a guide portion, a pair of fastening portions, and a rib, said sliding portion slidably supporting the suspension rail thereon, said pair of fastening portions being formed at the sides of the sliding portion and extending downwardly therefrom for gripping said connecting portion, said guide portion being formed at an end of said sliding portion and extending upwardly relatively to the sliding portion, said rib being formed continuously from an approximate midpoint of an edge portion of one of said fastening portions to an approximate midpoint of an edge portion of the other fastening portion around a peripheral edge of said guide portion, a notch being formed in each of said pair of fastening portions, said notches being located at said midpoint of said fastening portions defining a base portion of said rib.

2. A track belt for snowmobiles as claimed in claim 1, which further comprises tension members made of a material from a group consisting of a woven fabric of synthetic fibers, cord of synthetic fibers, and a metallic cord; lateral stiffening members made of bars of a material selected from the group consisting of steel and FRP, said stiffening members being disposed on said tension members at predetermined intervals in the longitudinal direction of the track belt; upper and lower protective sheets made of a woven fabric of synthetic fibers and disposed to hold between the same said tension members and said lateral stiffening members; and a flexible member made of a rubber and covering altogether said protective sheets, said tension members and said lateral stiffening members, said lateral stiffening members being disposed where said connecting portions are disposed.

* * * * *